(12) United States Patent
Lyons et al.

(10) Patent No.: US 6,356,212 B1
(45) Date of Patent: Mar. 12, 2002

(54) SINGLE CLOCK REFERENCE FOR COMPRESSED DOMAIN PROCESSING SYSTEMS

(75) Inventors: Paul Wallace Lyons, New Egypt, NJ (US); Alfonse Anthony Acampora, Staten Island, NY (US); John Prickett Beltz, Willingboro, NJ (US); Victor Vincent D'Alessandro, Berkley Heights, NJ (US); Clifford Arthur Pecota, Lebanon, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/506,612

(22) Filed: Feb. 18, 2000

(51) Int. Cl.[7] .............................. H03M 7/00; G11B 5/09
(52) U.S. Cl. .............................. 341/60; 360/51; 360/48
(58) Field of Search ........................ 341/60, 50; 360/51, 360/48

(56) References Cited

U.S. PATENT DOCUMENTS 5,619,337 A * 4/1997 Naimpally ................... 386/83
5,990,967 A * 11/1999 Kawakami et al. .......... 348/500
6,157,674 A * 12/2000 Oda et al. .................... 375/240

* cited by examiner

*Primary Examiner*—Peguy JeanPierre
(74) *Attorney, Agent, or Firm*—William J. Burke

(57) ABSTRACT

A device and method for utilizing a single clock signal to generate a digital data stream signal for transmission in a compressed domain transmission system. The device includes a plurality of packetized elementary stream encoders electronically coupled to a transport stream encoder electronically coupled to an output interface adapted to generate the digital data stream signal. The method includes: operating each of the packetized elementary stream encoders responsively to the single clock sequence to generate a plurality of packetized elementary stream signals; operating the transport stream encoder responsively to the single clock signal to form a transport stream signal from the plurality of packetized elementary stream signals, wherein the transport stream signal includes a plurality of data packets each formed using the transport stream encoder and select ones of the plurality of data packets formed by the transport stream encoder include synchronization data; and, operating the output interface responsively to the single clock reference to output the digital data stream signal in compliance with an predefined manner.

25 Claims, 6 Drawing Sheets

SINGLE CLOCK REFERENCE FOR COMPRESSED DOMAIN PROCESSING SYSTEMS

GOVERNMENT INTERESTS

This invention was made with U.S. government support and funded by NIST under contract number 70NANB5H1174. The U.S. government has certain rights in this invention.

FIELD OF INVENTION

The present invention relates generally to signal processing systems and more particularly to systems for generating digital, compressed domain signals such as ATSC and DVB compliant signals.

BACKGROUND OF INVENTION

As the popularity of digital broadcasting systems grows so does the demand for reliable, efficient and affordable digital transmission systems. A particular application currently gaining widespread acceptance and support is digital television. The ATSC (Advanced Television Systems Committee) DTV (Digital Television) standard describes a system adapted to transmit high-quality video, audio and ancillary data over a single channel. The present invention will be discussed as it relates to the ATSC DTV standard for sake of explanation, however it should be understood the present invention is equally applicable to other digital broadcasting systems and applications as well. An alternative approach to which the present invention is equally applicable, for example, is the DVB (Digital Video Broadcasting) standard for example.

As is well known, the ATSC broadcast system includes three general subsystems: source coding and compression, service multiplex and transport, and transmission. Basically, the first subsystem, source coding and compression, deals with bit rate reduction for the video, audio and ancillary digital data streams. The second subsystem, service multiplex and transport, deals with dividing each digital stream into "packets" and multiplexing the video stream packets, audio stream packets and ancillary digital data stream packets into a single transport stream. The ATSC standard employs the Motion Pictures Experts Group MPEG-2 transport stream syntax for packetization and multiplex of the video, audio and ancillary digital data. Finally, the third subsystem, transmission, deals with channel coding and modulation.

The present invention deals particularly with the second subsystem, service multiplex and transport. For a more detailed explanation of the ATSC standard, the reader is referred to "ATSC Digital Television Standard", ATSC Standard A/53 (1995) and "Guide to the Use of the ATSC Digital Television Standard", Doc. A/54 (1995) both published by the Advanced Television Standards Committee, Washington D.C., the entire disclosures of which are hereby incorporated by reference as if being set forth herein in their respective entireties.

One approach to creating ATSC transport packets from compressed video, audio and data streams is illustrated in FIG. 1. Payload data, which in the embodiment of FIG. 1 takes the form of compressed video data at input 12, compressed audio data at input 14 and compressed ancillary data at input 16 from Packetized Elementary Stream ("PES") encoders 10 are sent to the Transport Stream Encoder ("TSE") 20 where 188 byte transport packets at output 22 are formed therefrom. Each 188 byte transport packet at output 22 can include a fixed-length link layer, a variable-length adaptation layer and a payload of data as is well understood. As is also known, the fixed link layer is used for packet synchronization, packet identification, error correction and conditional access. The adaptation layer also serves to provide synchronization, as well as to enable random entry into the data stream and local programming insertion. As is understood by those possessing ordinary skill in the art, unlike conventional analog NTSC television signals which utilize the concept of synch pulses whereby a clock rate can be directly derived from each picture itself, the amount of data for each picture in a compressed digital system is variable. Hence, a loss of synchronization in a compressed domain digital system can readily lead to buffer over- or underflow. To mitigate this possibility, timing or synchronization data is transmitted in select ones of the output transport packets, 22 referred to as Program Clock Reference ("PCR") packets.

Still referring to FIG. 1, the approach illustrated therein is to supply a reference frequency 40 to a clock generator 30. The clock generator 30 supplies timing to the sampling mechanisms in the encoders 10, 20 and to the timing packet generation system PCR GEN 50, to create a PCR packet for synchronizing signal receiving decoders. Because internal buffers 21, 61 within the TSE 20 and output interface 60 respectively are typically utilized, and to avoid variable latencies associated with such buffering, the PCR packet is multiplexed at the output interface 60 instead of within the TSE 20 where the other packets are formed. Thus, the system requires a PCR generator 50 at the output as is illustrated in FIG. 1. An independent output byte clock 70 is used to transfer the transport packet bytes from the output interface 60 to the transmission equipment using a conventional driver stage 65, e.g. to the third subsystem.

However, such a configuration yields an undesirably complex device as multistage counters (42 stages for example) are typically required for the PCR generator.

It is an object of the present invention to simplify the method and system of transport packet generation and PCR packet insertion by moving the functionality of PCR packet formation and insertion into the TSE 20.

SUMMARY OF INVENTION

A device and method for utilizing a single clock signal to generate a digital data stream signal for transmission in a compressed domain transmission system. The device includes a plurality of packetized elementary stream encoders electronically coupled to a transport stream encoder electronically coupled to an output interface adapted to generate the digital data stream signal. The method includes: operating each of the packetized elementary stream encoders responsively to the single clock sequence to generate a plurality of packetized elementary stream signals; operating the transport stream encoder responsively to the single clock signal to form a transport stream signal from the plurality of packetized elementary stream signals, wherein the transport stream signal includes a plurality of data packets each formed using the transport stream encoder and select ones of the plurality of data packets formed by the transport stream encoder include synchronization data; and, operating the output interface responsively to the single clock reference to output the digital data stream signal in compliance with a predefined manner.

DETAILED DESCRIPTION OF THE INVENTION

Figure 1:
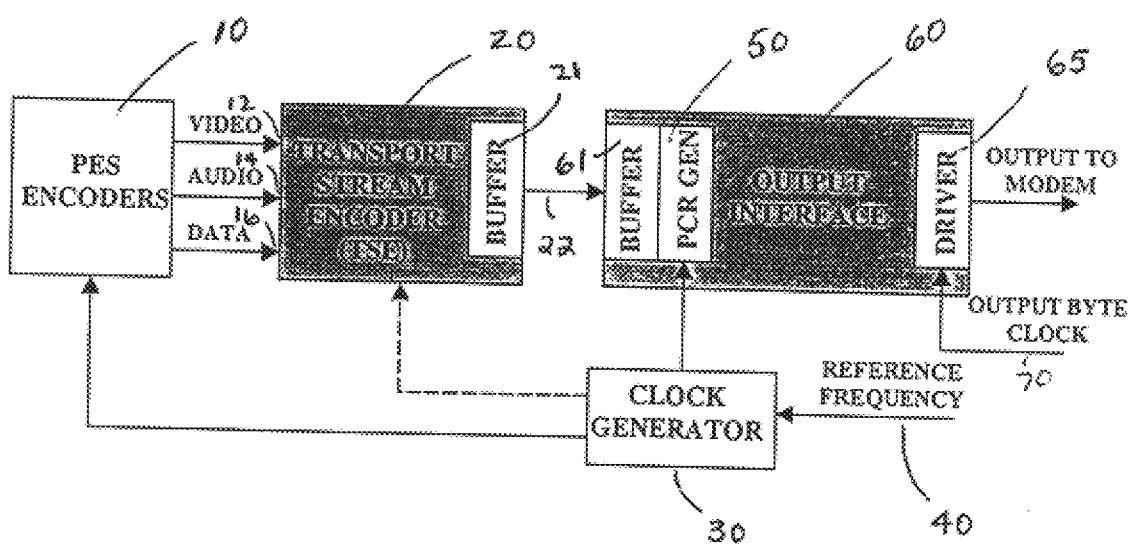
FIG. 1 illustrates a device which uses a first approach for creating transport packets for transmission.
Figure 2:
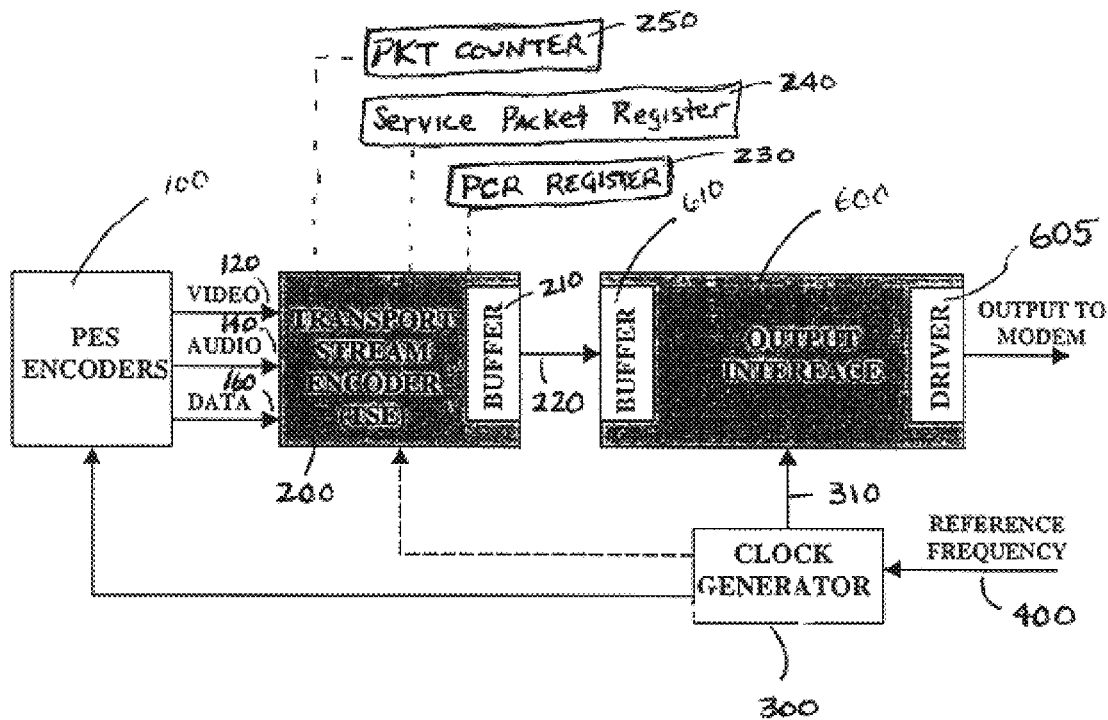
FIG. 2 illustrates a device which uses an approach according to the present invention for creating transport packets for transmission.

Referring now to FIGS. 2–6 wherein like references identify like elements of the invention, the present invention essentially locks the output byte clock signal 310 to a derivative (preferably 27 Mhz) of the reference frequency 400. FIG. 2 illustrates the major functional elements associated with generating transport packets for transmission according to the present invention. Using such a device and approach, PCR packet generation can be vastly simplified such that large counting mechanisms (42 stage for example) are not required. Moreover, often tricky interface standards, such as DVB-ASI can be easily accomplished according to the present invention. Although locking the byte clock to the reference frequency is a necessary condition for achieving the foregoing simplification in design, it is the process of using this locked relationship that forms the core of the invention.

Referring still to FIG. 2, a single reference frequency 400 input to the clock generator 300 is used to lock a voltage controlled crystal oscillator ("VCXO") 320 within the clock generator 300. The output interface 600 receives transport packets from output 220 generated by the TSE 200 and outputs these transport packets to the transmission interface at a constant bit rate compliant with selected output interface specification such as DVB-ASI Synchronous Serial Interface, SMPTE 305M-1998 Serial Data Transport Interface, SMPTE 310M Synchronous Serial Interface for MPEG-2 Digital Transport Stream or GA-TSE Parallel Interface.

The clock generator 300 uses the reference frequency 400 to synchronize the output bit rate and provide for PCR packet generation. Typical examples of available frequencies include: TV Broadcast Studio Atomic Clock Reference—10 Mhz, Global Positioning Satellite (GPS)—1, 5 or 10 Mhz, an on-board 54.0 MHz crystal oscillator and Horizontal/Vertical/Composite video sync signals.

Figure 3:
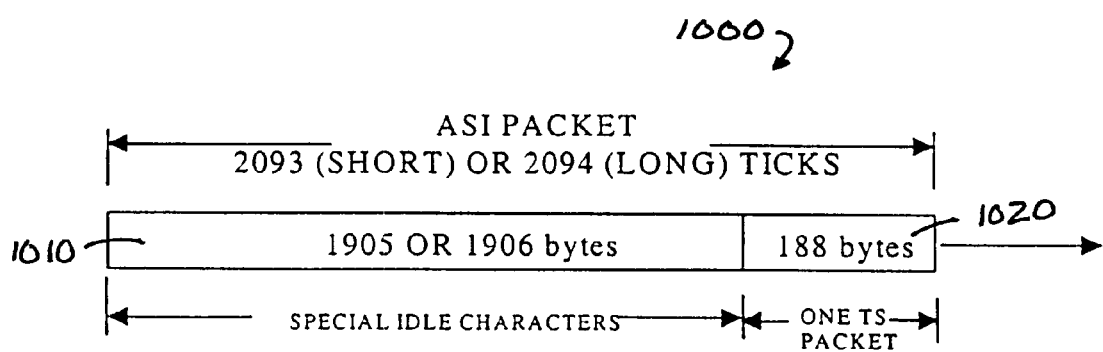
FIG. 3 iilustrates the format of an ASI packet according to the present invention.

The VCXO 320 within the clock generator 300 preferably operates at a center frequency of 27 Mhz. This 27 Mhz frequency is applied to the output interface 600, and is used to control the output bit rate. This locked clock approach facilitates the formation of various output format standards. In the particular case of ASI output, a logic circuit can use the 27 MHz signal to generate the data clock for inputting data to the ASI chipset. As is known, the DVB-ASI format specifies a data rate of 27 Mbytes/sec, and allows for insertion of specially defined idle characters both between transport packets and within transport packets. In order to map the ATSC byte rate to this interface rate, the technique according to the present invention is to only insert the specially defined idle characters between transport packets. Referring now also to FIG. 3, prior to the initiation of a transport packet output by the TSE 200, special idle characters are continuously output. After a transport packet data output is initiated, the format of the output 220 from the TSE 200 is a flow of 188 packet bytes 1020 followed by a string of the specially defined idle characters 1010 before the next transport packet bytes 1020 are issued. Thus an ASI packet 1000 can be readily formed.

Figure 4:
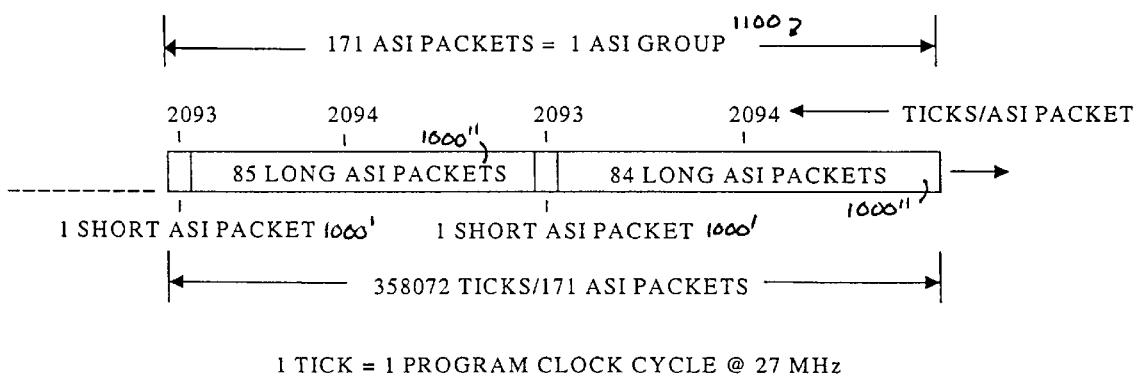
FIG. 4 illustrates the format of an ASI data stream according to the present invention.

According to the present method, the output byte clock 310 and PCR packet generation are locked through a series of hardware and software techniques. Referring to FIG. 2, PCR packets are formed in the TSE 200 and not in the output interface 600. In order to ensure PCR packets issued by the TSE 200 are properly placed, two types of Asynchronous Serial Interface (ASI) packets 1000 are created, short and long packets 1000' and 1000", as is shown in FIGS. 3 and 4. In the short ASI packet 1000', 1,905 special idle character bytes 1010 are inserted after a 188 byte transport packet 1020. In the long ASI packet 1000", 1,906 special idle character bytes 1010 are inserted after the 188 byte transport packet 1020. Therefore, each short ASI packet 1000' has a total of 2,093 bytes while each long ASI packet 1000" has a total of 2,094 bytes.

Both the transport packet bytes and special idle character bytes are serialized to a 270 Mbps DVB-ASI output interface rate by the output interface 600 accordingly, each byte of an ASI packet 1000 is output each cycle, or tick, of the 27 MHz clock. Referring now also to FIG. 4, to minimize jitter between successive PCR transport packets in the stream, an ASI Group 1100 formed from a well defined assortment of short and long ASI packets 1000 is identified. The ASI group 1100 is defined as 1 short ASI packet 1000', followed by 85 long ASI packets 1000", followed by 1 short ASI packet 1000', and finally by 84 long ASI packets 1000" totaling 171 assorted short and long ASI packets 1000.

This operation can also be defined in terms of ticks of the 27 Mhz clock. During the time interval associated with 171 assorted short and long ASI packets 1000, there are exactly 358,072 program clock ticks (1*2093+85*2094+1*2093 +84*2094; remembering 1 clock tick per byte output). Output byte timing can be determined by allocating a distinct pattern of 27 MHz PCR clock cycles to each defined ASI Group 1100. In other words, exactly 2093 PCR cycles are allocatable to the first packet 1000', followed by 2094 PCR cycles for each of the next 85 packets 1000", followed 2093 PCR cycles for the next packet 1000', finally followed by 2094 PCR cycles for each of the next 84 packets 1000", to generate a smoothed flow output as illustrated in FIG. 4.

It should be remembered the basic ATSC clock (A) is 27 MHz. The packet clock can be calculated using the NTSC standard 525 data segments/frame and 30 frames/sec. Accordingly, the NTSC horizontal frequency (H) is 15734.2 segments/sec ((30×525)×(1000/1001). There are 684 NTSC standard symbols per data segment, 832 ATSC standard symbols per VSB segment, 312 ATSC standard data segments per VSB field and 313 ATSC standard total segments per VSB field. Accordingly, the ATSC packet clock (P) equals H=(684/832)=(312/313), or 12,894.05 packets per second. The number of Bytes (NB) per packet for ATSC is 188, while for DVB is 204. The Byte Clock (BATSC) for an ATSC system equals P×NB or 12,894.05×188, or 2.4 Mhz= 19.4 Mbps. Likewise, the Byte Clock (BDVB) for a DVB system equals 12,894.05×204, or 2.6 Mhz=21.04 Mbps. Hence, the integer relationship between the Byte clock and 27 MHz clock signal for ATSC is BATSc/A, or 8037/89518 and for DVB is BDVB/A, or 8721/89518. Finally, as the integer relationship between the Packet clock and the 27 MHz clock is P/A or (4617/358072)/27=171/358072, there are exactly 358,072 cycles of the 27 MHz clock signal every 171 packets, independent of output format, i.e., ATSC or DVB.

It should also be recognized packet spacing is relatively uniform with only one clock cycle of 27 MHz difference between a few of the packets. As the 27 Mhz PCR clock is locked to the output byte clock 310 (in FIG. 2), bytes are output exactly at the ATSC output rate relative to the PCR timing reference.

The locked byte clock can be used to great advantage in PCR generation. The method according to the present invention does not use complex, long, multistage counter chains. At system reset, the TSE 200 generates a PCR packet as the first packet to be output. This packet contains the PCR value that is valid as the packet leaves the output interface 600 via a conventional driver stage 605. It should be recognized that, in general, the first packet need be the PCR packet only if a specific value, relative to real-time such as the time of day, is to be inserted into the PCR packet. The important concept being that other PCR packets are inserted into the data stream at uniformly regular packet intervals, and with known incremental values (see FIG. 5 for example). Multiplexed packets of video, audio, and other data for example from the TSE 200 follow the PCR packet in accordance with the packet schedule within the TSE 200. Buffer 210 within the TSE 200 fills until such time that a full block of data ready for transfer to the output interface 600. Packets are generated and loaded into the TSE 200 at a rate that is faster than real-time utilizing null characters if necessary. A block of data is transferred from the TSE 200 to the output interface 600 based upon available space in buffer 610. Packets of data are analogously output from the buffer 610 for the ATSC specified rate; e.g. 27 MHz. clock signal 310. When a PCR packet is to be output by the TSE 200, operation is interrupted and a PCR packet having a proper PCR value is loaded to the buffer 610.

Figure 5:
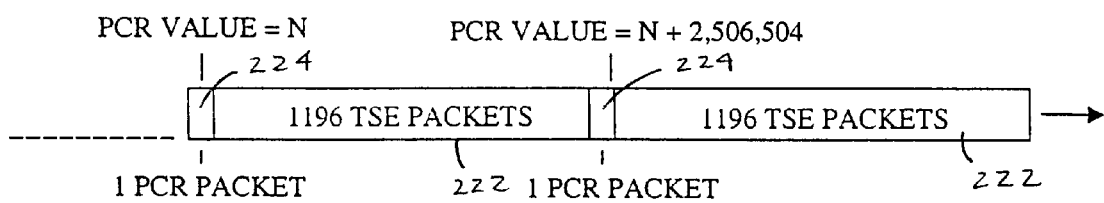
FIG. 5 illustrates PCR packet spacing according to the present invention.

Referring still to FIG. 5, in order to have an integer number of 27 MHz clock cycles occur between PCR packet insertions, the PCR packet 224 must be inserted every N×171 transport packets 222, where N is an integer. It is usual to have the largest spacing between PCR packets permissible under ATSC standards. The ATSC standard requires the a PCR packet be generated (with or without a data payload) spaced in time no greater than every 100 ms. Evenly spaced PCR packets are generated by the TSE 200 such that one PCR packet per 1197 transport packets (7 Packet Groups*171 ASI Packets/Packet Group) is output. PCR packets contain the PCR base and PCR extension of the PCR. In this way, if a PCR packet is generated once every 1197 transport packets, then a PCR packet will be generated roughly every 93 ms and the MPEG-2 PCR update specification requirements for ATSC streams will be met. Additionally, the choice of generating a PCR packet every 1197 transport packets results in an increment of the PCR value by exactly 2,506,504 ticks of the 27 MHz clock.

In other words, PCR packet generation must occur in the range of around every 100 ms. 171 ASI packets is equivalent to 358,072 cycles of 27 MHz or 13.3 ms. 171×7=1197 packets which are equivalent to 2,506,504 cycles of 27 MHz or 92.8 ms. At initialization, the PCR is set to a predetermined value (i.e., 0 or the present time of day). Every 1197 transport packets, 2,506,504 is added to the PCR value and a PCR packet is generated. 2,506,504/300==0×20A3 with a remainder of 0×4 (in HEX). Therefore, 0×20A3 is added to the 33 bit PCR base (M) and 0×4 is added to the 9 bit modulus 300 remainder (N).

The inserted PCR value can be calculated using this increment according to the PCR base and PCR extension format described in the ATSC Digital Television Standard. This process locks the PCR to the output bit/Byte clock 310 since the calculation is based upon the number of transport packets that have been output. Therefore, the PCR packet is generated at a specific packet count from the last PCR packet, and the contents of the PCR data in the PCR packet is a fixed increment from the contents of the last PCR packet, as is illustrated in FIG. 5. As will be evident to those possessing ordinary skill in the art, all of this can be accomplished with no relation to real-time, except that transport packets must be generated by the TSE 200 faster than the output stream rate, on average. Thus PCR packet generation and insertion can be accomplished using a straightforward software module and avoids the use of complex counter stages.

Figure 6:
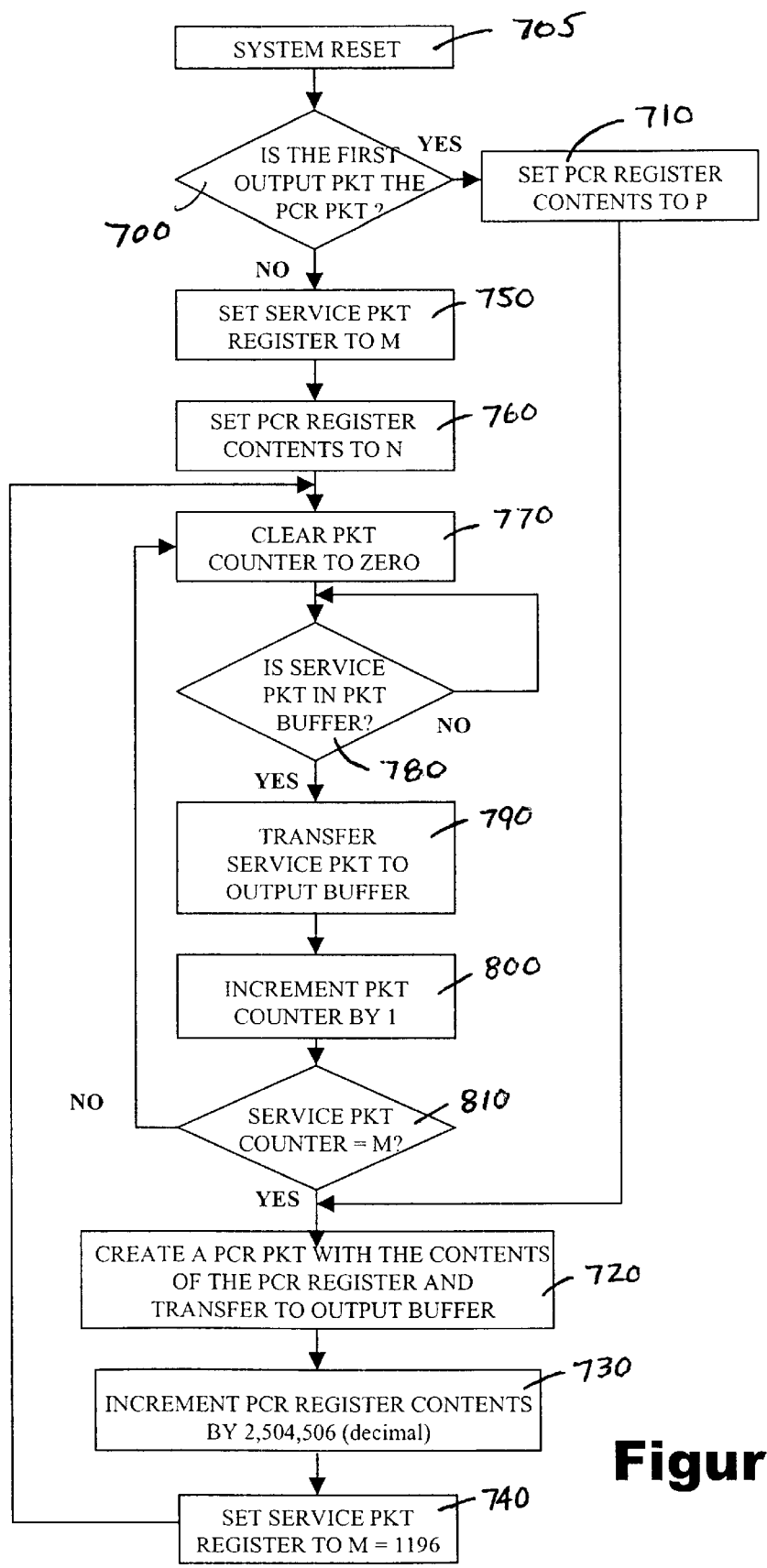
FIG. 6 illustrates a preferred sequence of operations for operating this device of FIG. 2 according to the present invention.

Referring again now to FIG. 2 and now also to FIG. 6 therein is respectively illustrated a preferred embodiment of a device according to the present invention and a preferred sequence of operations for operating that device. As is well known the PES encoders 100 function to generate compressed video data signal 120, compressed audio data signal 140 and compressed ancillary data signal 160 which are respectively fed into the TSE 200. After system reset 705, the first output packet can be either PCR packet or another packet 700. It is of course understood that this is a system operator choice, it being more straightforward for the first packet output to be a PCR packet, however, not being a necessary condition. If the first output packet is to be a PCR packet, a PCR register 230 accessible by the TSE 200 is set to a number P at step 710. The number P in the PCR register 230 is inputted by the system operator and represents the PCR value of the first PCR packet to be output. It can for example represent the present time of day, the time for future play-to-air, or any arbitrary number consistent within MPEG compliance. The TSE 200 then generates a PCR packet with the contents of the PCR register 230 and transfers this PCR packet to buffer to 610 at step 720. The contents of the PCR register 230 are then incremented by 2,504,506 at step 730. A service packet register 240 which indicates the number of packets which should be input to the buffer 610 before another PCR packet is generated and is also accessible by the TSE 200 is then set to 1196 (M=1196) at step 740 consistently with the format illustrated in FIG. 5. A packet counter 250 which tracks the number of packets which have been transferred to the buffer 610 is reset to 0 at step 770. Next, the TSE 200 determines whether there is a 188 byte packet in the buffer 210 at step 780. If there is not, the TSE 200 awaits such a packet. When a packet is in the buffer 210, that packet is transferred from the buffer 210 to the buffer 610 at step 790. The packet counter 250 is then incremented by 1 to represent a packet has been transferred to the buffer 610 at step 800. The packet counter 250 is then compared with the value of M stored in the service packet register 240 to determine whether another PCR packet needs to be inserted yet at step 810. If it does not, the system returns to step 780 to determine whether or not another packet is present in buffer 210. On the other hand, if the packet counter equals M, or 1196 in accordance with FIG. 5, the TSE 200 creates another PCR packet with the contents of the PCR register and transfers that packet directly to the output buffer 610 at step 720. Again, the system increments the PCR register at step 730 and sets the service packet register to 1196 at step 740 and continues to operate.

If the first output packet was not decided by the system operator to be a PCR packet at step 700, the service packet register 240 is set to a number M which is inputted by the system operator and at this point represents the number of service packets 220 that will precede the insertion of the PCR packet at step 750. In turn, the PCR register 230 is set to a number N which is input by the system operator and represents the PCR value of the first PCR packet at step 760. Again, it can be the present time of day, the time for future play-to-air or any arbitrary number consistent with a MPEG compliance. Generally, the number N may need to be calculated given the number M of preceding service packets in the output buffer and the packet rate. The system then continues to operate as set forth preceding to step 770.

It should be understood that as the buffer 610 empties at a cognizable rate dependent upon the 27 Mhz signal 310 provided by the clock generator 300, the delay associated with buffer 610 can be readily ascertained. Additionally, as PCR packets are inserted directly to the input of the buffer 610 by the TSE 200, and are not applied to the buffer 210, the predicted value for each PCR packet is also readily calculable. In other words, and referring again to FIG. 5, TSE 200 proceeds to generate 1196 188 byte packets as is conventionally accomplished. The TSE 200 upon recognizing that 1196 TSE packets have been output (Packet counter 250=service packet register 240) applies a PCR packet having a PCR value which has been incremented by 2,506,504 from the previous PCR (found in PCR register 230) value to the input of the buffer 610. The TSE 200 then proceeds to again stream 1196 188 byte packets into the buffer 210 for output to the buffer 610. In this way, data being transferred from the buffer 210 to the buffer 610 is essentially interrupted by the TSE 200 for insertion of PCR packets once every 1197 packets transferred and have values which are each incremented by 2,506,504 from the previous PCR value once every 1197 packets transferred.

Stream timing information in the form of a PCRB is also required by the audio and video processing components, the STD Buffer Model component and the stream VBV_delay calculation component. The TSE 200 can maintain a current PCRB calculation based upon the number of packets 1000 that have been generated, thus far. A PCRB value can be calculated for any byte stored in the buffer 210 following the transport multiplex by knowing the number of bytes that followed the last PCR insertion up to the byte of interest according to: $PCRB_{CALC} = PCRB_{LAST} + (BYTES\_STORED * 9000 / BYTE\_CLK)$ where $PCRB_{LAST}$ is the PCR base value that was last inserted into a PCR packet and BYTES_STORED is the number of bytes placed in the post Mux buffer (210 in FIG. 2) since the last PCR packet.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. A method for generating a compressed domain digital signal for transmission, said method comprising:

generating a plurality of packetized elementary stream signals from a corresponding plurality of data sources responsively to a single clock signal;

generating a transport stream signal from said plurality of packetized elementary stream signals responsively to said single clock signal; and, outputting an output stream signal generated from said transport stream signal in response to said single clock signal, said output stream being adapted to comply with an output interface specification.

2. The method of claim 1, wherein said plurality of data sources includes at least one video source, audio source and other data source.

3. The method of claim 2, wherein said single clock signal is a 27 MHz clock signal.

4. The method of claim 3, wherein said output interface specification is selected from the group consisting of: DVB-ASI Synchronous Serial Interface, SMPTE 305M-1998 Serial Data Transport Interface, SMPTE 310M Synchronous Serial Interface and GA-TSE Parallel Interface.

5. The method of claim 3, wherein said transport stream comprises a plurality of 188 byte transport packets.

6. The method of claim 5, wherein select ones of said 188 byte transport packets include synchronization data.

7. The method of claim 5, wherein said output stream signal comprises ASI data packets, wherein at least some of said ASI packets each include at least one of said 188 byte transport packets and at least one predefined idle character.

8. The method of claim 7, wherein said plurality of ASI packets include ASI packets of a first type and ASI packets of a second type, wherein said first type of ASI packets have 2,093 bytes and said second type of ASI packets have 2,094 bytes.

9. The method of claim 8, wherein said generating said output stream signal from said transport stream signal comprises serializing said transport stream signal into a 270 Mbps DVB-ASI signal.

10. The method of claim 8, further comprising defining an ASI group as including 1 first type ASI packet, followed by 85 second type ASI packets, followed by 1 first type ASI packet and 84 second type ASI packets and formatting said plurality of ASI packets into ASI groups.

11. The method of claim 10, further comprising:

generating one of said select 188 byte transport packets having a first synchronizing value;

incrementing said first synchronizing value by 2,506,504 every 1197 transport packets; and, generating another of said select 188 byte transport packets having said incremented synchronizing value.

12. The method of claim 1, further comprising generating said single clock signal from a reference frequency selected from the group consisting of: a TV Broadcast Studio 10 MHz Atomic Clock Reference, a Global Positioning Satellite (GPS) signal, an on-board crystal oscillator signal and a Horizontal/Vertical/Composite video sync signal.

13. The method of claim 1, wherein said 188 byte transport packets are generated at a rate faster than real-time.

14. A method for utilizing a single clock signal to generate a digital data stream signal for transmission in a compressed domain transmission system including a plurality of packetized elementary stream encoders electronically coupled to a transport stream encoder electronically coupled to an output interface adapted to generate said digital data stream signal, said method comprising:

operating each of said packetized elementary stream encoders responsively to said single clock sequence to generate a plurality of packetized elementary stream signals;

operating said transport stream encoder responsively to said single clock signal to form a transport stream signal from said plurality of packetized elementary stream signals, wherein said transport stream signal comprises a plurality of data packets each formed using said transport stream encoder and select ones of said plurality of data packets formed by said transport stream encoder include synchronization data; and, operating said output interface responsively to said single clock reference to output said digital data stream signal in compliance with an predefined manner.

15. The method of claim 14, wherein said predefined manner is selected from the group consisting of: DVB-ASI Synchronous Serial Interface, SMPTE 305M-1998 Serial Data Transport Interface, SMPTE 310M Synchronous Serial Interface and GA-TSE Parallel Interface.

16. The method of claim 15, wherein said single clock signal is a 27 MHz clock signal.

17. The method of claim 15, wherein said plurality of data packets comprises a plurality of 188 byte transport packets.

18. The method of claim 17, wherein said digital data stream signal comprises ASI data packets each including at least one of said 188 byte transport packets and at least one predefined idle character.

19. The method of claim 18, wherein said plurality of ASI packets include ASI packets of a first type having a total of 2093 bytes of data and ASI packets of a second type having a total of 2094 bytes of data.

20. The method of claim 19, wherein said operating said output interface comprises generating said digital data stream signal from said transport stream signal by serializing said transport stream signal into a 270 Mbps signal.

21. The method of claim 20, wherein said plurality of ASI packets are organized into ASI groups each including 1 first type ASI packet, followed by 85 second type ASI packets, followed by 1 first type ASI packet followed by 84 second type ASI packets.

22. The method of claim 21, wherein said 188 byte transport packets are generated at a rate faster than real-time.

23. A device for generating a digital signal suitable for transmission in a compressed domain processing system from a plurality of data sources, said device comprising:

a transport stream encoder for generating a first digital data stream signal comprising a plurality of first data packets each having 188 bytes of data, wherein select ones of said first data packets include data adapted to be used by at least one receiver to synchronize its respective operation with that of said system;

a plurality of packetized elementary stream encoders electronically coupled to said transport stream encoder, and for providing a corresponding plurality of compressed digital signals to said transport stream encoder, wherein said transport stream encoder generates said first digital data stream signal from said plurality of compressed digital signals; and an output interface electronically coupled to said transport stream encoder and for generating a second digital data stream signal from said first digital data stream signal, said second digital data stream signal comprising a second plurality of data packets each including at least one of said first data packets;

wherein, said second plurality of data packets includes second data packets of a first type having a first number of total bytes and second data packets of a second type having a second number of total bytes, and said first number of total bytes is distinct from said second number of total bytes.

24. The device of claim 22, wherein said first and second types of second packets are organized into a predefined pattern in said second digital data signal.

25. The device of claim 22, wherein said data adapted to be used by said at least one receiver to synchronize its respective operation with that of said system includes program clock reference base data and program clock reference extension data.

* * * * *